United States Patent [19]

Patel

[11] 3,913,068

[45] Oct. 14, 1975

[54] ERROR CORRECTION OF SERIAL DATA USING A SUBFIELD CODE

[75] Inventor: Arvind M. Patel, San Jose, Calif.

[73] Assignee: IBM Corporation, Armonk, N.Y.

[22] Filed: July 30, 1974

[21] Appl. No.: 493,195

[52] U.S. Cl. .............. 340/146.1 AL; 340/146.1 AL
[51] Int. Cl.² .......................................... G06F 11/12
[58] Field of Search ......... 340/146.1 AL, 146.1 AQ, 340/146.1 D, 172.5; 178/69.5 R

[56] References Cited

UNITED STATES PATENTS

| | | | |
|---|---|---|---|
| 3,623,155 | 11/1971 | Hsiao et al. | 340/146.1 AL |
| 3,629,824 | 12/1971 | Bossen | 340/146.1 AL |
| 3,697,948 | 10/1972 | Bossen | 340/146.1 AL |
| 3,745,526 | 7/1973 | Hong et al. | 340/146.1 AL |
| 3,786,439 | 1/1974 | McDonald et al. | 340/146.1 AL |
| 3,800,281 | 3/1974 | Devore et al. | 340/146.1 AL |
| 3,851,306 | 11/1974 | Patel | 340/146.1 AL |

*Primary Examiner*—Charles E. Atkinson
*Attorney, Agent, or Firm*—James E. Murray

[57] ABSTRACT

This specification describes an error correction scheme for digital information serially recorded on a magnetic medium; for example, in stripes oriented diagonally across magnetic tape. The digital information is arranged in segments made up of a set of data sections and two subfield code sections generated on a byte for byte basis from the set of data sections in accordance with Patel U.S. Pat. No. 3,745,528. Thus the first byte of each of the subfield code sections is generated from the first bytes in all the data sections, the second byte of each subfield code section is generated from the second bytes in all the data sections and so on. Each of the sections in the segment is terminated with a synchronization burst. With this arrangement up to two full sections of any data segment can be corrected using these subfield code sections.

9 Claims, 7 Drawing Figures

ERROR CORRECTION OF SERIAL DATA USING A SUBFIELD CODE

BACKGROUND OF THE INVENTION

1. Field of the Invention

This invention generally relates to electronic information processing and more particularly to error correction in a magnetic medium reading system.

2. Description of the Prior Art

Defects frequently occur in or on media used to store digital data. For example, a dirt particle may become imbedded in the surface of a magnetic tape, preventing the correct recording of digital information at that point. Other defects may occur during the manufacture of the medium, may be due to creasing of the medium during use, maybe as a result of external scratching, heating, etc., or the defect may be simulated during a data transfer.

One recording arrangement for correcting errors in digital data on multi track tapes containing such defects involves the use of subfield codes as described in Patel U.S. Pat. No. 3,745,528. In that recording arrangement, two of the tracks of the multi track tapes contain subfield code check digits for protecting the data digits in the tracks of the tape digit position for digit position on the tracks. Data is arranged on the tape in blocks made up of $k$ bytes, each containing $f$ bits of data. Each byte of data is on one of the tracks of the tape so that there are $k + 2$ tracks on the tape. When pointers are provided to identify bytes in error this described error correction arrangement will correct up to two full bytes in error.

Studies of tape defects show that it is highly unlikely for a defect to effect more than one track on conventionally recorded ½-inch tape. Therefore the described data format is more than adequate to protect data recorded in parallel tracks of a conventionally recorded ½-inch tape. However not all data is recorded on a multi track tape as described. Some data is formatted into a single serial sequence of data blocks and recorded on tape. As shall be seen subsequently in this specification, this type of recording is especially susceptible to multi-block errors particularly if the effective length of a given defect is increased by packing the data closer together.

In one method of serial recording, data is sequentially recorded in tracks (stripes) oriented diagonally across the medium. Diagonal stripes record data serially from one tape edge to the other and then in from the first edge again. In serial and more particularly diagonal recording even good data can be misinterpreted because of synchronization losses due to defects. Each binary digit to be recorded is actually encoded and written as a plurality of bits (for example, binary couples) to achieve high recording density despite signal coupling problems unique to diagonal recording, as described in Patel U.S. Pat. No. 3,810,111. In the example, once binary couples are recorded on stripes, it is essential that reading progress with properly framed pairs of bits so that properly constituted couples (as opposed to bit pairs from separate couples) representative of recorded digits are read and decoded.

SUMMARY OF THE INVENTION

These problems of serial recording and more particularly diagonal recording using binary couples are overcome by the present invention by a unique application of the subfield code described in Patel U.S. Pat. No. 3,745,528 to blocks of data recorded serially. The blocks of data are arranged in serial groupings called sections. Each section is followed by a synchronization burst of binary information whose wave form can be distinguised from the wave form of ordinary data. After $k$ sections of data there are two sections of check digits each followed by synchronization bursts. The check digits are subfield code check digits generated in accordance with Patel U.S. Pat. No. 3,745,528 from the $k$ data sections preceding it on a byte for byte basis. Thus the first data byte of each subfield code section is generated from the first data byte in each of the $k$ data sections and the second data byte of each subfield code section is generated from the second data byte in each of the $k$ data sections and so on. This set of $k$ data and two code sections is referred to as a data segment and represents an independent data group that can be read out without reference from an error correction standpoint to any other data group. Up to two full data sections in the data segment can be corrected using the subfield code sections.

Preferably the length of the data sections are longer than the longest error burst expected to be caused by a defect in the tape or any other source of errors, so that all expected burst errors can be corrected using the present error correction system irrespective of the recording density. Furthermore, the loss of data synchronization is guarded against by the provision of the synchronization burst at the end of each data and code section. If the data is recorded on the magnetic tape using the coding technique described in Patel U.S. Pat. No. 3,810,111 this synchronization burst could be an invalid data waveform pattern such as one that violates the charge constraint but maintains the minimum and maximum length constraints of that coding technique. In addition, if the coding technique of U.S. Pat. No. 3,810,111 is employed the error detection system of that patent can be used to generate pointers to indicate data segments to be corrected by the subfield code check digits.

The foregoing and other features and advantages of the invention will be apparent from the following more particular description of preferred embodiments of the invention, as illustrated in the accompanying drawings.

IN THE DRAWING

FIG. 1*a* shows the format of prior art longitudinal recording on magentic tape.

FIG. 1*b* shows the format of prior art diagonal recording on magnetic tape.

FIG. 2*a* illustrates in detail a bit configuration which may be used in the format shown in FIG. 1*b*.

FIG. 2*b* is a table used to explain utilization of the bit configuration shown in FIG. 2*a*.

GENERAL DESCRIPTION

Figure 1A:
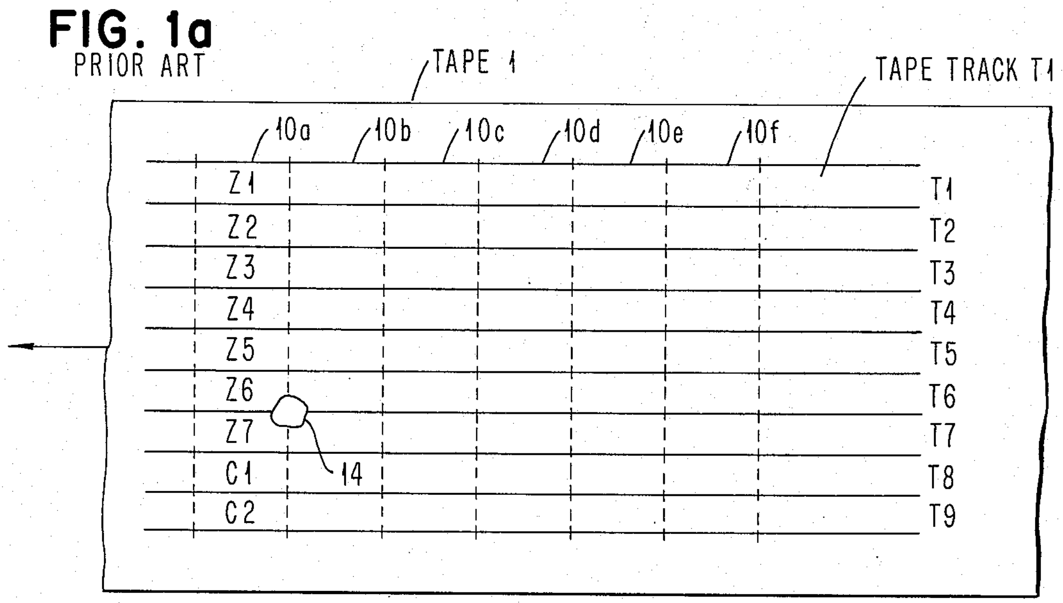

Referring first to FIG. 1*a*, there is schematically shown a conventional magnetic tape 1 known as ½-inch nine-track magnetic recording tape. This tape consists of a base material of polyester film coated on one side with a flexible layer of ferromagnetic material dispersed in a suitable binder. Information or data represented as electrical signals is recorded on the magnetic tape by magnetizing discrete points on the tape along tracks T1 through T9. In accordance with Patel U.S. Pat. No. 3,745,528, specific data is represented as information characters grouped in blocks along the direction (indicated by an arrow) of movement of the tape. Each block 10 consists of seven bytes of data $Z_1$ to $Z_7$ and two check bytes $C_1 = Z_1 \oplus Z_2 \oplus Z_3 \ldots \oplus Z_7$ and $C_2 = T^{\lambda}\ Z_1 \oplus T^{2\lambda}\ Z_2 \oplus T^{3\lambda}\ Z_3 \ldots T^{7\lambda}\ Z_7$. In these formulas T is the companion matrix of a binary primative. Polynomial $g(x)$ of degree $f$ and $\lambda$ is an integer given by the expression $t(2^f-1)/(2^b-1)$ in which $t$ is any positive integer prime to $2^b-1$. These check bytes are generated from the data bytes as explained in U.S. Pat. No. 3,745,528. With this arrangement a defect 14 causing up to two full bytes of data in the same block to be in error can be corrected when pointers exist to indicate the track or tracks in error. Furthermore, if the error extends across block lines the check bytes of the adjacent blocks will correct errors in the adjacent blocks to the same extent. Since studies show that it is highly unlikely that defects will affect more than one track of conventionally recorded tape, it would appear that the described error correction arrangement would more than adequately protect such a conventional tape recording.

There are also known schemes other than those requiring the recording of characters longitudinally along a tape as shown in FIG. 1*a*. For example, referring to FIG. 1*b*, it is well known to serially or sequentially record information diagonally across the direction of motion (shown by the arrow) of the tape 1'. While the information is continuously recorded across the tape in stripes S-l through S-n, it is evident from FIG. 1*b* that the stripes are discontinuous in that a stripe is recorded diagonally from top to bottom and then back again from the bottom. However, for the purposes of understanding the operation of such a recording technique, it may be assumed that the recording is continuous. Each character written across tracks T1–T9 in FIG. 1*a* is written as a series of manifestations along the stripes S-1, etc. in FIG. 1*b*.

The occurrence of the same defect 14 on the tape 1' has a considerably different effect on information recorded on stripe S-1 than defect 14 has on tracks T6 and T7 in FIG. 1*a*. The information in FIG. 1*a* that is lost due tc the defect may be detected or corrected, or both, as long as no more than a maximum of two cracks are effected. However, where information is sequentially recorded, the defect will effect a large number of data bits and may cause loss of synchronization which would make the rest of the stripe unreadable.

In accordance with the present invention, to facilitate the correction of data so recorded, the information in a tape stripe, such as tape stripe S-1, is divided into segments, sections, blocks, digits and bits. Each stripe is divided into 20 segments SG-1 through SG-20, each segment containing 4,320 bits. In turn, each segment is divided into 15 sections SN-1 through SN-15 of 288 bits each. Each section contains 17 blocks of which 16 (B-1 through B-16) are data blocks and the 17th block, SN-1(B), is a double-length data synchronization burst block. Each block contains 16 bits divided into 8 digits, *d*1 through *d*8, there being two bits to a digit. As explained below and in detail in the previously cross-referenced Patel U.S. Pat. No. 3,810,111 data digits are coded in data bit pairs or couples which are dependent on the bits both preceding and succeeding them. Thus, data digit *d*2 is a function of bits *a*1, *b*1, *a*2, *b*2, *a*3, and *b*3.

Figure 2A:
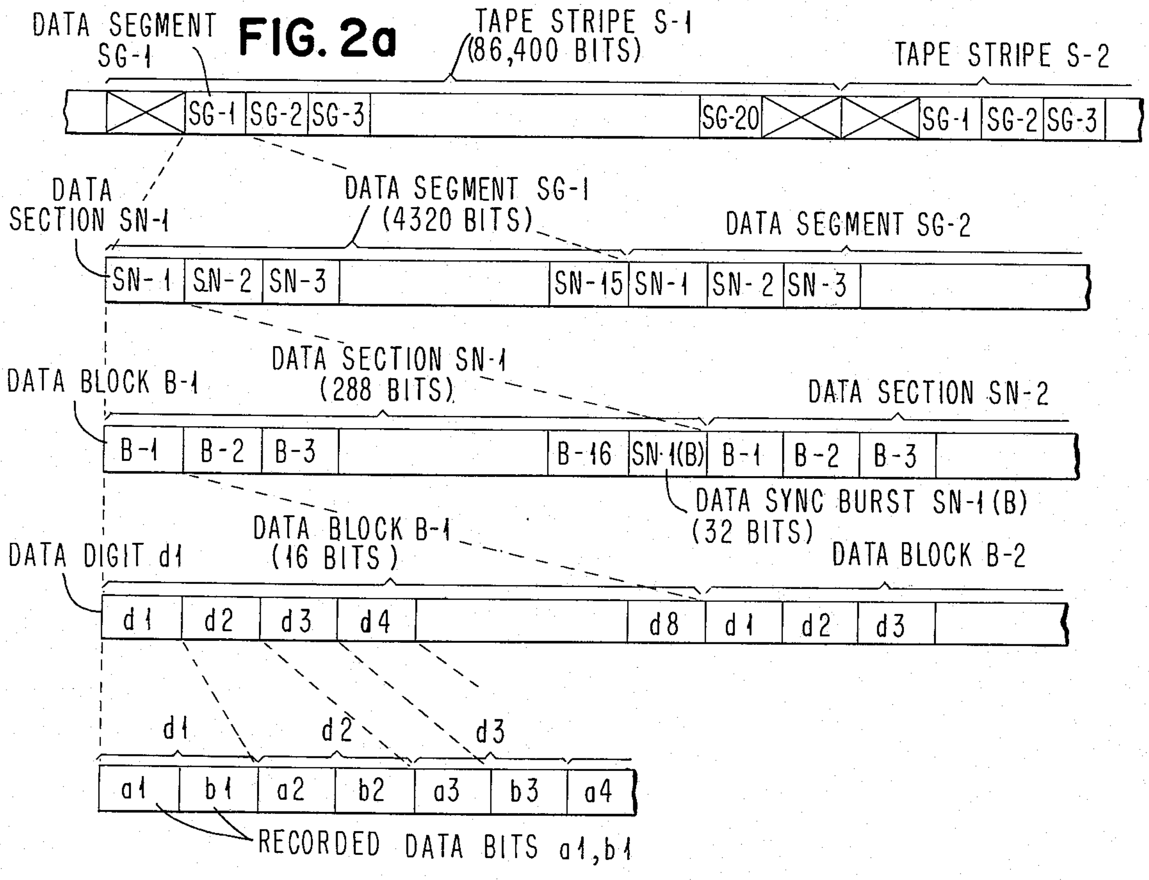
Figure 2B:
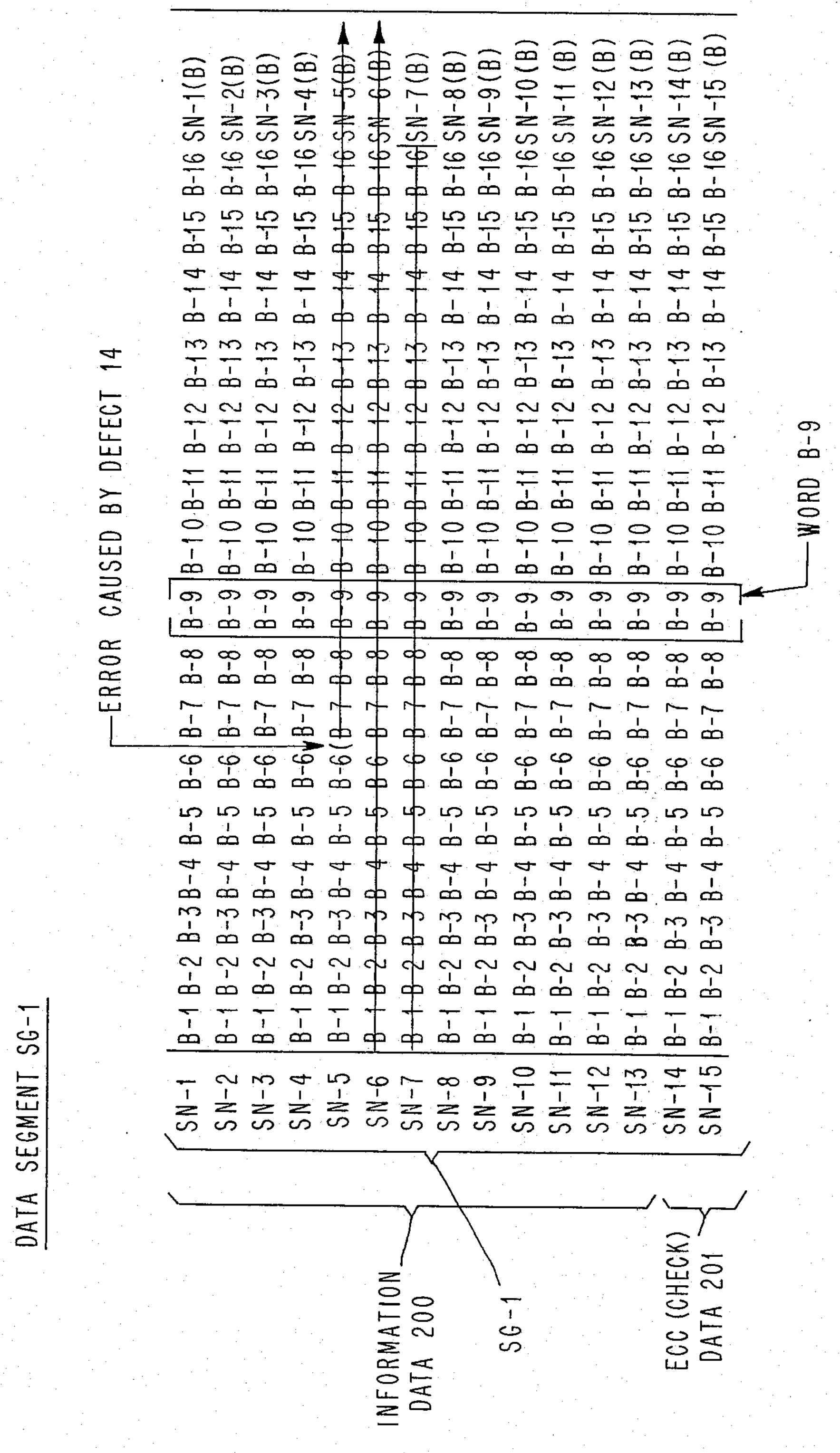

Referring now to FIG. 2*b*, the segment SG-1 in FIG. 2*a* has been rearranged so that the 15 sections SN-1 through SN-15 comprising the segment and their constituent blocks B-1 through B-16 are aligned beneath each other as shown. The double-length synchronization burst blocks SN-1(B) through SN-15(B) are also shown at their assigned positions. The data segment SG-1, as are all the data segments, is divided into 16 code words; for example, code word B-9 is shown by brackets. Each word is divided into an information data portion 200 and an error correcting code (ECC) check data portion 201. The check data portion is generated in accordance with Patel U.S. Pat. No. 3,745,528 where the first check section SN-14 = SN-1 ⊕ SN-2⊕ SN-3 ⊕ . . . ⊕ SN-13 and the second check section SN-15 = $T^{\lambda}$ SN-1⊕ $T^{2\lambda}$ SN-2 ⊕ $T^{3\lambda}$ SN-3 . . .⊕ $T^{13\lambda}$ SN-13 where T is a companion matrix of a binary primitive polynomial $g(x)$ of a degree $f$ and $\lambda$ is an integer given by the expression $t(2^f-1)/(2^b-1)$ in whicn $t$ is any positive integer prime to $2^b-1$ as set forth in Patel U.S. Pat. No. 3,745,528. The check sections are generated from the data sections on a digit for digit basis. Thus the first check byte in check sections SN-14 and SN-15 is generated in accordance with the recited formulas using the first bytes in each of the data sections SN-1 to SN-13 and the second check byte in check sections SN-14 and SN-15 is generated in accordance with the recited formulas using the second bytes in each of the data sections SN-1 to SN-13 and so on byte for byte until the end of the data section.

Figure 1B:
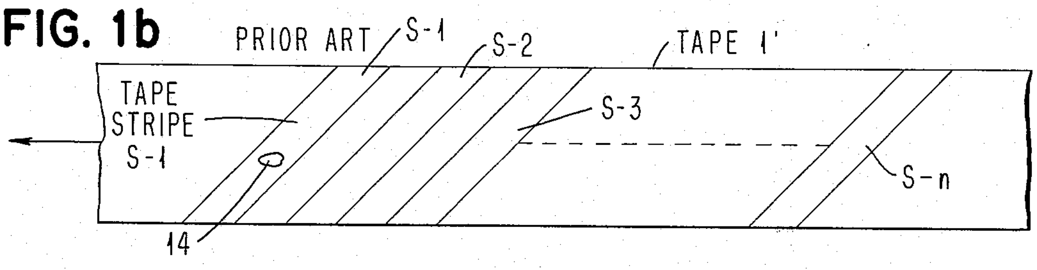

The physical span of the defect 14 in FIG. 1*b* is shown by the parenthesized portions of sections SN-5 and SN-6 in FIG. 2*b*. Since the data segment SG-1 corresponds to the data block in Patel U.S. Pat. No. 3,745,528 and the data and check sections SN-1 to SN-15 are merely extended bit versions of the data and check bytes $Z_1$ to $Z_k$ and $C_1$ and $C_2$ in U.S. Pat. No. 3,745,528, it should be apparent an error burst to the extent of that physical span should be easily correctable using the techniques set forth in the patent. The error burst effects only two data sections, SN-5 and SN-6, and the subfield code check sections can correct up to all the bits in two full data sections when those data sections are identified by pointers. The pointers referred to are derived from the system in which error correcting is taking place. A pointer of particular importance in this system is the output of the error detection circuitry of FIG. 11 in U.S. Pat. No. 3,810,111 which indicates that an invalid zero modulation waveform pattern has been detected. However, other indicators in the system such as the low signal amplitude or phase detectors in the read amplifiers could also provide pointers to sections in error in the present invention.

However, the effective length of an error can be greater than the physical span of a defect such as defect 14 because the defect can cause loss of synchronization. Each block's meaning as data is determined by coupled pairs of sequential bits in FIG. 2*a*. If normally non-coupled pairs of bits are erroneously interpreted as pairs, incorrect data results. The synchronization burst characters are used to maintain and/or regain appropriate synchronization between sequential bits read and their appropriate coupling. When a synchronization burst character such as SN-6(B) is lost due to a defect, incorrect synchronization may result in erroneous data. Here, the synchronization burst character SN-6(B), obliterated by the defect, would normally permit the reestablishment of data detection. However, due to the loss of SN-6(B), all data in blocks B-1 through B-16 preceding the next synchronization burst SN-7(B) is also lost. While the error check characters 201 would correct all the errors in segment SG-1 to the extent of the physical span of the defect 14 because errors do not effect more than two data sections, SN-5 and SN-6. It cannot correct any errors in the segment SG-1 if section SN-7 contains data digits incorrectly interpreted from the data bits recorded because resynchronization character SN-6(B) was lost.

The problem and the solution to the problem may be theoretically and rigorously stated in the following terms: Many non-linear encoding (digital modulation) schemes map a length $n$, $n \geq 1$, ordered sequence of data characters into a length $m$, $m \geq 2$, ordered sequence of channel characters before use in a transmission device. Typical examples are zero modulation (see the cross-referenced Patel U.S. Pat. No. 3,810,111) where each data bit is mapped into a binary couple, $d \longrightarrow (a_n b_n)$, or non-linear pseudo-ternary triple, $(d_1 d_2 d_3 d_4)_i \rightarrow (a_i b_i c_i)$ (Introduction to Pseudo-Ternary Codes, A. Croisier, IBM Journal of Research and Development, May 1970). After use, decoding the detected waveforms typically involves evaluation of a function defined on one or more of the encoded $m$-tuples. As long as the decoder is properly synchronized with respect to the sequences of $m$-tuples, errors resulting from misdetected characters are limited by the effective memory length of the decoding function. However, if one or more characters from the sequence of $m$-tuples should be lost, or should the detection clock used to synchronize the received signals with the receiving circuit, slip in phase by one or more character cycles, the decoder could lose the phase reference necessary to properly define the $m$-tuples for decoding. Thus, once the phase reference is lost, the resulting error would be propagated until the decoder was reset by a received resynchronization character having a known signal pattern. A method for preventing this type of error propagation may be illustrated using zero modulation (ZM) as an example, where the decoded digit is the data digit corresponding to the $(n+\mathbf{b})$ ZM couple, i.e. $(d_{ab})_{n+1}$ or $(d_{ba})_{n+1}$. The decoding function is defined on the sequence of three ZM couples $[(a_n, b_n), (a_{n+1}, b_{n+1}), (a_{n+2}, b_{n+2})]$ by $$d_{ab} = b_{n+1} + a_{n+1}\bar{a}_{n+2}\bar{b}_{n+2} + \bar{a}_{n+1}a_n\bar{b}_n$$

where $d_{ab}$ is the $i$-th data bit and $d_{ba}$ would be the right-hand adjacent $i$+1-th data bit. Symbolically, the decoding function could be represented as:

$$d_{ab} + F[(a_n, b_n), (a_{n+1}, b_{n+1}), (a_{n+2}, b_{n-2})].$$

Should a single ZM bit be lost or the detector clock slip by one ZM bit cycle (e.g. during a drop-out accompanied by a velocity variation), the decoding function would then be erroneously defined on the sequence of ZM couples $[(b_n, a_{n+1}), (b_{n+a}, a_{n+2}), (b_{n+2}, a_{n+3})]$, i.e.

$$d_{ab} = a_{n+2} + b_{n+1}\bar{b}_{n+2}\bar{a}_{n+3} + \bar{b}_{n+1}b_n\bar{a}_{n+1}.$$

Furthermore, since the phase reference of the decoder cannot be reset until a resynchronization character has been detected in the sequence of ZM digits, all subsequent data would also be incorrectly decoded until the reset was effected. This error propagation due to a lost phase reference can be prevented by using two decoders operating in parallel with a relative phase lag of one ZM bit cycle. The output of both decoders would be buffered until a resync character was encountered and the correctly decoded data would then be taken from the buffer corresponding to a "proper phase" of the resync character with respect to the clock and the ZM decoding function. For example, if the resync character were the sequence . . . 00101000101000 . . ., the correctly decoded buffer would be that for which the ZM sequence was mapped into the couples (0,0), (1,0), (1,0), (0,0), (0,1), (0,1) for decoding. The alternate mapping (1,1), (0,1), (0,1), etc., would be out of phase by one ZM bit and would correspond to the incorrect buffer.

A complete description of the apparatus for resynching can be found in co-pending Marshall U.S. application Ser. No. 372,389 filed June 21, 1973 and assigned to the assignee of the present invention. All that need be pointed out here is the resynch character or burst is distinguishable from ordinary data waveforms in that it is not a valid data pattern for the Zero Modulation (ZM) code described in Patel U.S. Pat. No. 3,810,111. It differs from the ordinary ZM data waveforms in that it violates the charge constraint but maintains the minimum and maximum run length constraints of the ZM code.

The synchronizing sequence is made short enough that charge accumulation is not a problem. The following two sequences are the minimum length sequences that violate the charge constraint.

$w = 00101000101000$ $w^* = 00010100010100$

That is, the occurrence of either of these waveforms violates the charge constraint without regard to the charge value at the beginning of the sequence. Thus, these waveforms will not occur in valid data sequence or in a valid sequence that is incorrectly clocked, and circuits described in the patent will detect such a sequence as an error. When one of these sequences is used for synchronization, the error detection circuits are modified to recognize the sequence as a synchronizing sequence and not as data. Any pattern containing $w$ or $w^*$ can be used for synchronization.

Figure 3:
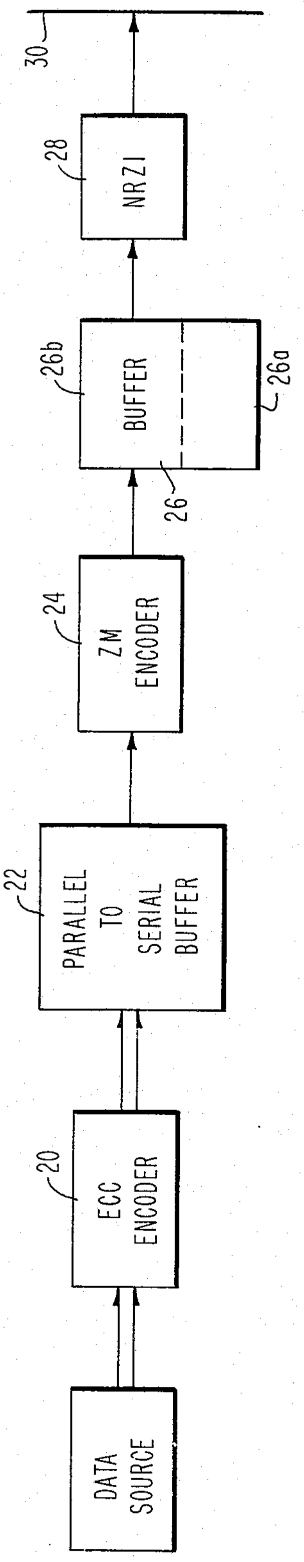
FIG. 3 is a logic diagram, the encoding circuitry, of a tape recording system employing the present invention.
Figure 4:
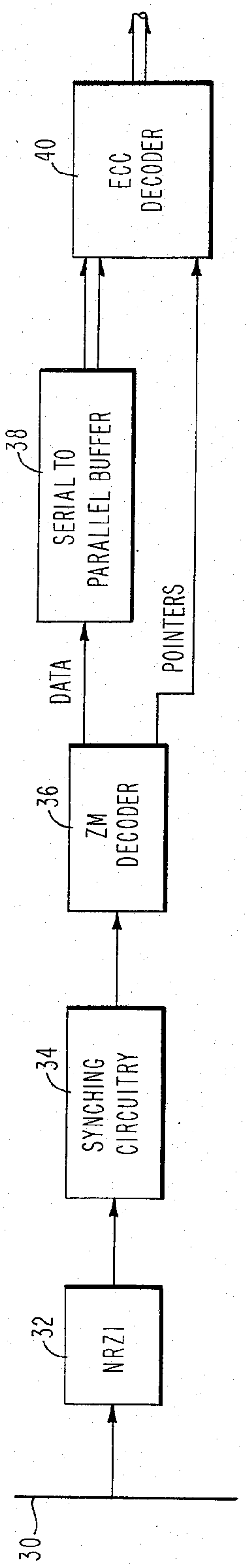
FIG. 4 is a logic diagram of the decoding circuitry of a tape recording system employing the present invention.
Figure 5:
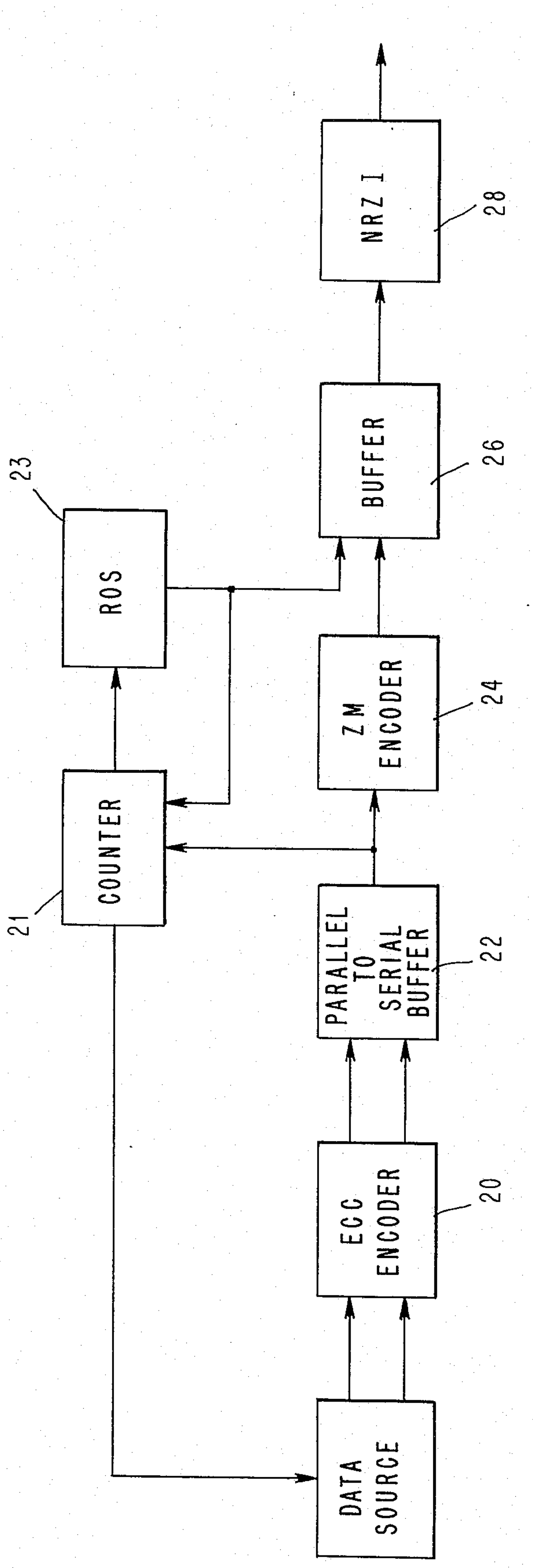
FIG. 5 is an alternative logic of the encoding circuitry of a tape recording system employing the present invention.

Referring now to FIG. 3 we can see how the data can be serially arranged on tape employing the present invention. The data is presented in 8 bit blocks to the ECC generator 20 which is of the type described in Patel U.S. Pat. No. 3,745,528. FIG. 3 of the above-mentioned Patel patent shows an encoder for generating the check sections described in the present application. Of course, there has to be 16 sets of shift registers 18 as shown in FIGS. 4 and 5 in the Patel U.S. Pat. No. 3,745,528 since there are 16 blocks of data B-1 to B-16 in each data section. The distributor in FIG. 3 of the Patel patent will sequentially apply each block of data to the proper set of shift registers.

The output of the error correction generator 20 is fed into a buffer 22 serving as a parallel to serial converter for converting the output of the error correction generator into a string of digits fed serially into the input of the zero modulation encoder 24. Zero modulation encoder 24 is described in detail in Patel U.S. Pat. No. 3,810,111 and is shown in FIG. 2 of that patent.

The coded output of the zero modulation encoder is fed into a second buffer 26. This second buffer 26 is used to add the sync signal to each of the data and check sections. This can be done by reserving a portion of the buffer 26*a* for the sync signals which would be permanently stored in there while the remainder of the buffer 26*b* is used for storing the zero modulation output in section length portions. Alternatively a counter 21 would count the data and check pulses and periodically turn off the ZM apparatus 24 and insert the synchronization pulses from a synchronization pulse generator 23 such as a Read Only Store. Then when the data is read out of buffer 26*b* each section would be read out serially with a sync burst appended thereto in the manner formatted in FIG. 2*b*. The output of the buffer 26 is then fed into the NRZI encoding and recording circuitry 28 to be placed on the tape 30.

When data is to be read off the tape 30 it is detected and passed through the NRZI reading and decoding circuitry 32 into synching circuitry such as that of John Marshall, U.S. application Ser. No. 372,389, filed June 21, 1973. As described previously, the synching circuitry synchs the ZM data bit pairs or couples so they will not be erroneously decoded. The synched data is fed into the zero modulation decoding circuitry 36 of Patel. U.S. Pat. No. 3,745,528. The decoding circuitry is shown in FIG. 3 of the ZM patent and its function is to decode the data digits into single bit signals.

The output of the ZM decoder 36 is fed into a buffer 38 where the data is converted from serial form to parallel form and from there transferred in blocks to the subfield code error correction decoding circuitry 40. This circuitry is shown in FIG. 3 of the Patel subfield code patent. Of course the statements referring to the shift registers of the encoder 20 apply equally as well to the shift registers of the decoder 40. There must be 16 sets of the shift registers shown in FIG. 4 and 5 to accommodate the 16 blocks of data that must be decoded. An alternative to the circuitry shown in Patel U.S. Pat. No. 3,745,528 is a circuit shown and described in the Ouchi and Patel publication appearing on page 1432 of the October 1973 issue of the IBM Technical Disclosure Bulletin. By using buffers that permit time sharing of one set of shift registers for performing both encoding and decoding functions for all 16 blocks of data, a reduction of 16 to one in the number of sets of shift registers is obtained. Obviously, this and other changes can be made in the described embodiment without departing from the spirit and scope of the invention.

What is claimed is:

1. An error correction system for data bytes D to be arranged serially on a recording medium, comprising:

encoder means for generating two check bytes $C_1$ and $C_2$ from $k$ data bytes spaced $n$ data bytes apart from each other in the serial sequence wherein the first check byte $C_1 = D_1 \oplus D_2 \oplus D_3 \ldots \oplus D_k$ and second check byte $C_2 = T^{\lambda} D_1 \oplus T^{2\lambda} D_2 \oplus T^{3\lambda} D_3 \ldots \oplus T^{k\lambda} D_k$ where T is the companion matrix of a binary primative polynomial $g(x)$ of degree $f$ and $\lambda$ is any integer given by the expression $t(2^f-1)/(2^b-1)$ in which $t$ is any positive integer prime to $2^b-1$;

means for adding these $2n$ check bytes at the end of the string of $k \times n$ data bytes they are produced from and, synchronization pulse means providing a periodic synchronization burst of non data pulses in series with the data byte to synchronize the data.

2. The error correction system of claim 1 including encoding means for encoding each data digit in said data bytes in bit pairs or couples.

3. The error correction system of claim 2 wherein said synchronization pulse means is a means for generating an invalid code sequence of said bit pairs.

4. The error correction system of claim 1 wherein said encoding means is a means for providing encoded sequennce of data bit pairs that meet charge constraints and maximum and minimum run length constraints.

5. The error correction system of claim 4 wherein said synchronization pulse means is a means for generating a code sequence that violates said charge constraints but not the minimum or maximum run length constraints of said encoding means.

6. The error correction system of claim 1 wherein said synchronizing pulses means includes means for providing a burst of non data pulses after each $n$ data bytes used to calculate different check digits $C_1$ and $C_2$ and after $n$ check bytes $C_1$ and $n$ check bytes $C_2$.

7. The error correction system of claim 6 wherein said encoder means is for encoding said data and check digits in a zero modulation (ZM) code.

8. The error correction system of claim 7 wherein said synchronization pulse means includes means for generating an invalid ZM waveform pattern including the bits 00101000101000 or the bits 00010100010100.

9. The correction system of claim 6 including pointer means for detecting errors in said ZM coded data and check digits.

* * * * *